(12) United States Patent
Lattimer

(10) Patent No.: US 9,739,385 B1
(45) Date of Patent: Aug. 22, 2017

(54) PRESSURE RELIEF VALVE

(71) Applicant: Marathon Valve LLC, Houston, TX (US)

(72) Inventor: Daniel Greenfield Lattimer, Houston, TX (US)

(73) Assignee: Marathon Valve LLC, Houston, TX (US)

( * ) Notice: Subject to any disclaimer, the term of this patent is extended or adjusted under 35 U.S.C. 154(b) by 0 days.

(21) Appl. No.: 15/042,754

(22) Filed: Feb. 12, 2016

Related U.S. Application Data

(63) Continuation of application No. 14/291,301, filed on May 30, 2014, now Pat. No. 9,371,927.

(60) Provisional application No. 61/829,724, filed on May 31, 2013.

(51) Int. Cl.

| | | |
|---|---|---|
| *F16K 17/04* | (2006.01) | |
| *F16K 17/08* | (2006.01) | |
| *F16K 3/02* | (2006.01) | |
| *F16J 15/3204* | (2016.01) | |

(Continued)

(52) U.S. Cl.
CPC ....... *F16K 17/0426* (2013.01); *F16J 15/3204* (2013.01); *F16K 3/0263* (2013.01); *F16K 17/082* (2013.01); *F16J 9/12* (2013.01); *F16J 15/56* (2013.01); *F16K 17/0466* (2013.01)

(58) Field of Classification Search
CPC ........ F16K 3/0227; F16K 3/0263; F16K 3/20; F16K 3/18; F16K 17/0446; F16K 17/0466; F16K 17/0426; F16K 17/046; F16K 17/06; F16K 25/005; F16J 9/00; F16J 9/06; F16J 9/12; F16J 15/32; F16J 15/3284; F16J 15/56; Y10T 137/0497; Y10T 137/7738

USPC ..... 137/15.19, 469; 251/359, 360, 361, 362, 251/363, 364

See application file for complete search history.

(56) References Cited

U.S. PATENT DOCUMENTS

| | | | | |
|---|---|---|---|---|
| 2,575,214 | A | * | 11/1951 | Garland ..................... F16J 9/22 134/3 |
| 2,973,776 | A | | 3/1961 | Allen |
| 3,870,381 | A | | 3/1975 | Overkott |

(Continued)

OTHER PUBLICATIONS

United States Patent and Trademark Office, Notice of Allowance and Fee(s) Due, U.S. Appl. No. 14/735,850, which is a US related matter to the instant application, Mar. 8, 2016.

(Continued)

*Primary Examiner* — Mary McManmon
*Assistant Examiner* — Richard K Durden
(74) *Attorney, Agent, or Firm* — Howard L. Speight, PLLC

(57) ABSTRACT

An inlet port provides a fluid entrance to a body. A chamber has an inner surface. An outlet port is in fluid communication with the chamber and provides a fluid exit from the body. The piston is moveable within the chamber between a first set position, in which the inlet port is not in fluid communication with the outlet port, and a second open position, in which the inlet port is in fluid communication with the outlet port through the chamber. A seal guard is slidably disposed within the chamber. The seal guard is moveable between a first seal-guard position and a second seal-guard position in which the seal guard shields the seal. The seal guard is in the first seal-guard position when the piston is in its first set position and in the second seal-guard position when the piston is in its second open position.

3 Claims, 17 Drawing Sheets

(51) Int. Cl.
*F16J 9/12* (2006.01)
*F16J 15/56* (2006.01)

(56) References Cited

U.S. PATENT DOCUMENTS

| | | | |
|---|---|---|---|
| 3,991,240 A | 11/1976 | Harrington et al. | |
| 4,539,818 A | 9/1985 | Holland | |
| 5,158,052 A * | 10/1992 | Yoshimura | F02F 3/10 123/193.6 |
| 5,231,959 A | 8/1993 | Smietana | |
| 5,715,861 A | 2/1998 | Williams | |
| 6,571,822 B2 | 6/2003 | Neugebauer et al. | |
| 7,270,719 B2 * | 9/2007 | Berglund | C22C 38/001 148/225 |
| 7,664,282 B2 | 2/2010 | Urso et al. | |
| 2005/0056541 A1 * | 3/2005 | Oikawa | C25D 5/022 205/134 |
| 2014/0130662 A1 * | 5/2014 | Kabir | F16J 1/006 92/109 |

OTHER PUBLICATIONS

United States Patent and Trademark Office, Notice of Non-Final Office Action, U.S. Appl. No. 14/291,301, which is a parent of the instant application, Dec. 30, 2015.

United States Patent and Trademark Office, Notice of Non-Final Office Action, U.S. Appl. No. 14/735,850, which is a parent of the instant application, Dec. 30, 2015.

United States Patent and Trademark Office, Notice of Allowance and Fee(s) Due, U.S. Appl. No. 14/291,301, which is a US parent to the instant application, Mar. 23, 2016.

United States Patent and Trademark Office, Notice of Allowance and Fee(s) Due, U.S. Appl. No. 14/735,850 which is a continuation in part of U.S. Appl. No. 14/291,301, which is a US parent to the instant application, Mar. 28, 2016.

* cited by examiner

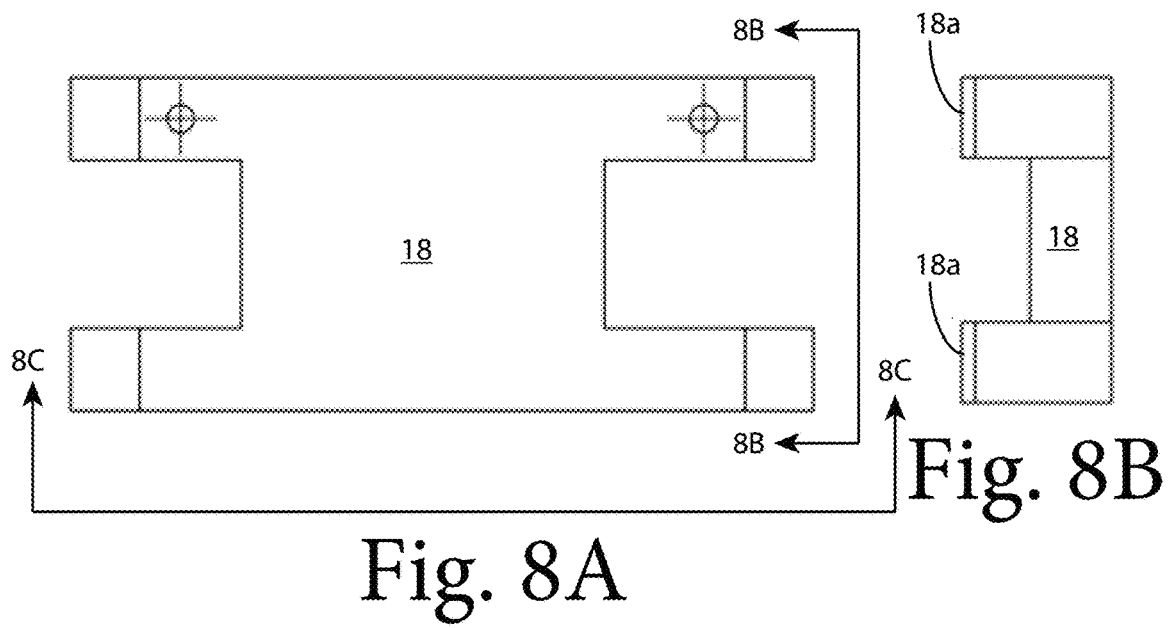
Fig. 8A
Fig. 8B
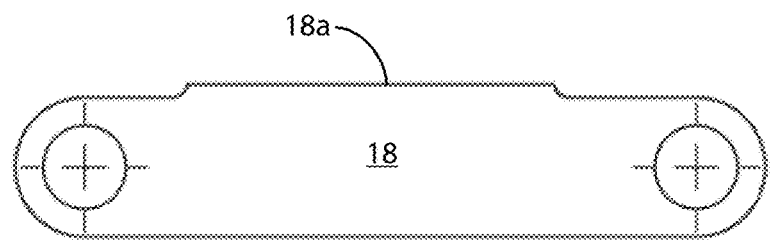
Fig. 8C
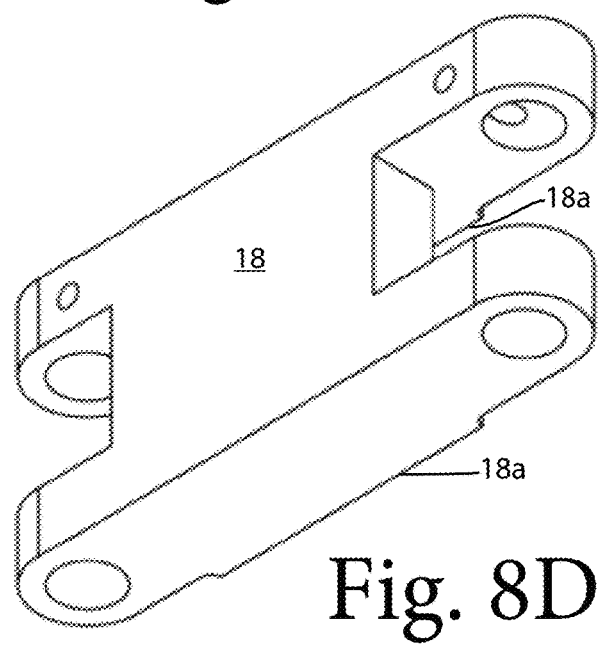
Fig. 8D

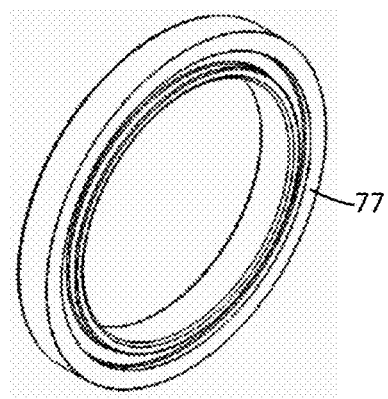
Fig. 12A
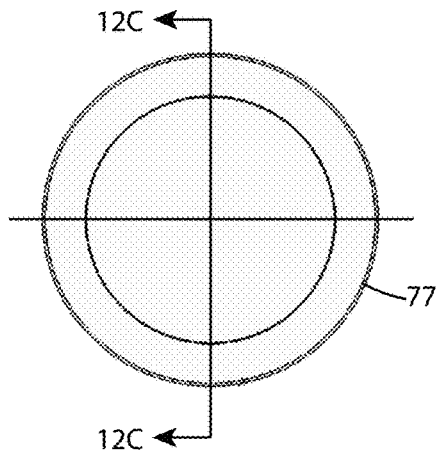
Fig. 12B
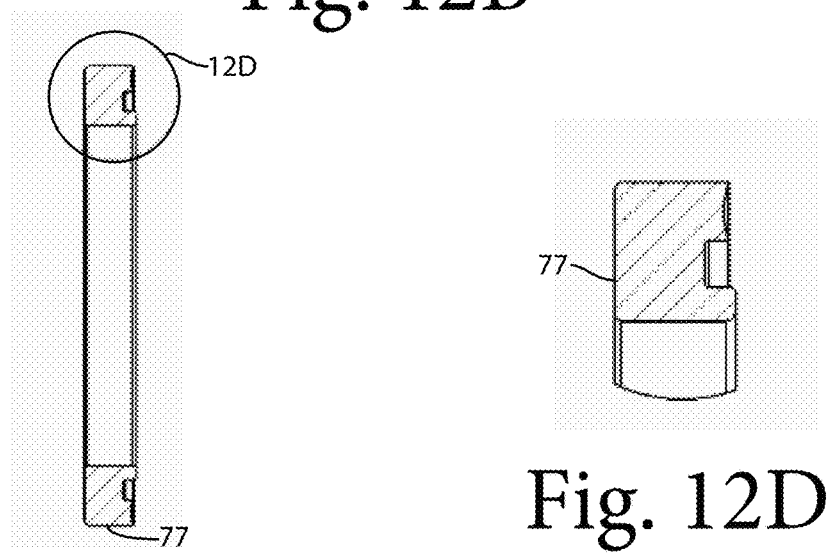
Fig. 12C
Fig. 12D

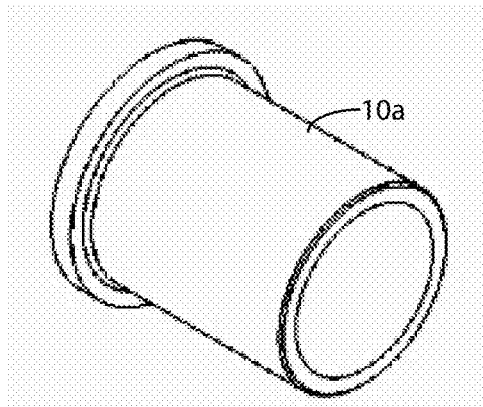
Fig. 16A
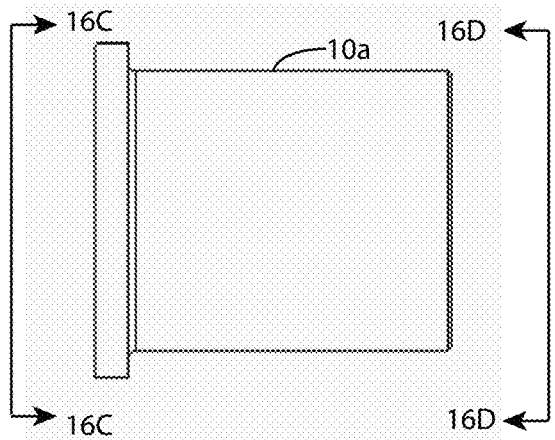
Fig. 16B
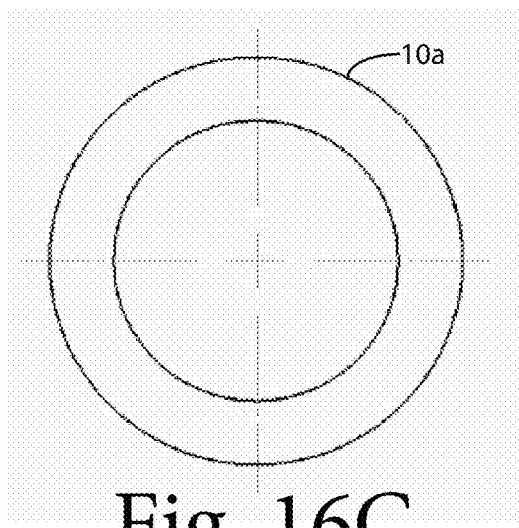 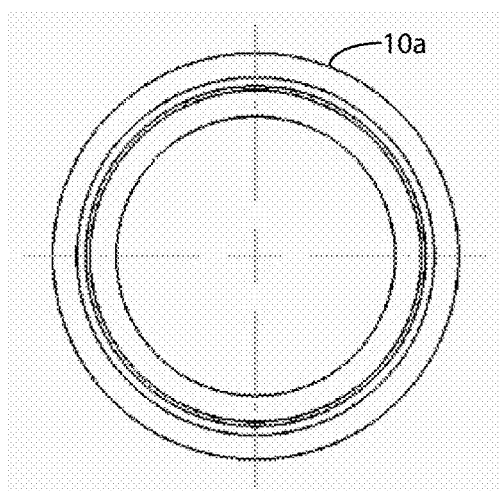
Fig. 16C  Fig. 16D

PRESSURE RELIEF VALVE

CROSS-REFERENCE TO RELATED APPLICATIONS

This application is a continuation of U.S. application Ser. No. 14/291,301, filed on May 30, 2014, entitled "Pressure Relief Valve,", which is incorporated by reference in its entirety. This application claims the benefit of U.S. Provisional Application No. 61/829,724, filed on May 31, 2013, entitled "Pressure Relief Valve,", which is incorporated by reference in its entirety.

BACKGROUND

This invention relates generally to pressure relief valves and more specifically to a quick-opening, or pop-off type, reset relief valves.

Pressure relief valves are important components in certain fluid flow systems in which undesirable high pressure may occur. In such systems, overpressure can damage valuable processing equipment, cause rupture of weak components, and/or a breakdown of the system. In many applications, it is desirable that when a pre-designated or pre-determined threshold pressure is exceeded, the pressure relief valve opens very quickly to relieve system pressure. Pressure relief valves having this capability are commonly referred to as "pop-off" valves because of their rapid opening action. In carrying out the rapid opening of the pressure relief valve and contact with process fluids, elements within the pressure relief valve, such as the seals and piston, are affected by friction within the pressure relief valve which directly affects the ability of the pressure relief valve to keep within its original calibrated parameters.

SUMMARY OF THE INVENTION

A pressure relief valve is provided that utilizes a seal guard comprised of a light weight alloy, such as titanium, but not limited to this particular alloy, automatically covering the lower piston seal from the high pressure abrasive fluid medium, e.g. drilling mud, when the pressure relief valve fully opens to relieve pressure. The seal guard does not affect the pressure relief valve's functionality and utilizes the flow of the systems fluid, when the pressure relief valve opens to relieve pressure, to automatically slide the seal guard over the lower piston seal. One or more springs may be used to aid or allow the seal guard to move fully into place protecting the lower piston seal.

To keep the level of friction within the valve consistent which in turn allows for the valve to keep within its originally calibrated parameters, coatings and low friction material are added. The piston has a hard coating of over 50 Rockwell on the two seal areas of the piston (on the end of the piston where the lower piston seal seals and the stem where the stem bushing seal 58 seals). These hard coated areas allow for the piston to keep a smooth surface of 20 microinches (µi) roughness average ($R_a$—which is defined to be the arithmetic average of the absolute values of roughness profile ordinates) (e.g. around 12 µi $R_a$) or better that prevents the abrasive fluid from causing distortion or scarring. Due to the trigger mechanism tilting the piston when the pressure relief valve is in the set position, a material with inherent low friction properties is used for the stem bushing insert so that the piston will have even resistance against the insert as the trigger mechanism allows the pressure relief valve to move from a closed position to an open position.

In order to limit friction on the upper piston seal, an insert is pressed into the valve body. The insert is made of a hard alloy, 40+ Rockwell, with a smooth finish, 20 µi $R_a$ or better (e.g. around 12 µi $R_a$), to ensure that the seal surface stays free of distortion or scarring.

The seal subjected to the most direct contact with the process fluid is the lower piston seal which uses a seal retainer and spacer ring to properly hold the seal. These two components allow for the seal to energize under pressure and seal against the piston. When the pressure relief valve rapidly opens, the seal retainer and spacer ring are able to maintain the seal's shape and integrity preventing distortion of the seal so that the valve can easily be reset.

The sub design keeps the spacer ring in alignment with the centerline of the lower seal which affects the function of the lower seal assembly. The pressure relief valve has a valve body insert consisting of an alloy with inherent corrosive and abrasive resistant properties, such as stainless steel, but not limited to this particular alloy. The sub is additionally designed to reduce galling when it is necessary to be removed for maintenance on the valve. In order to have the highest rate of fluid discharge possible, the sub is additionally designed with the inside diameter being open and free of any obstruction that will slow the flow of fluid being discharged.

In order for the trigger mechanism to open consistently at a set pressure, the lower link is made up of one piece rather than two. The uni-body construction allows for the lower link to stay parallel to the centerline of the crank ensuring that the movement is smooth, preventing false opening of the valve due to lower or higher pressure than the original calibration.

BRIEF DESCRIPTION OF THE DRAWINGS

FIGS. 8A-8D are views of the lower link.
FIGS. 12A-12D are views of the spacer ring.

FIGS. 16A-16D are views of the stem bushing insert.

DETAILED DESCRIPTION

A new pressure relief valve sustains its original calibration after opening several times in a normal operating environment, overcoming the problems set forth above. The components of the new pressure relief valve are not damaged by the pressure relief valve opening allowing the seals and other components involved in maintaining the sealing and opening action to keep the same resistance in the movement of the valve opening. As the pressure relief valve moves from a fluid blocking position to an open position, that seals and components exposed to fluid being discharged are protected from the fluid's abrasive characteristics.

Figure 15A:
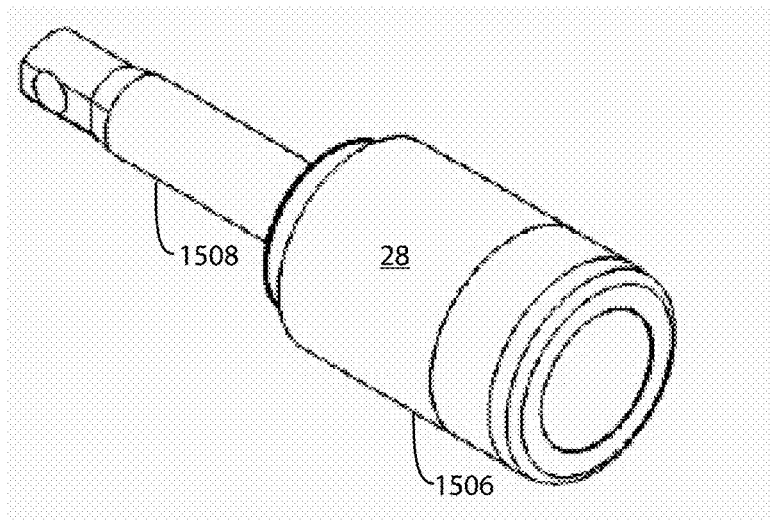
FIGS. 15A-15C are views of the piston.
Figure 15B:
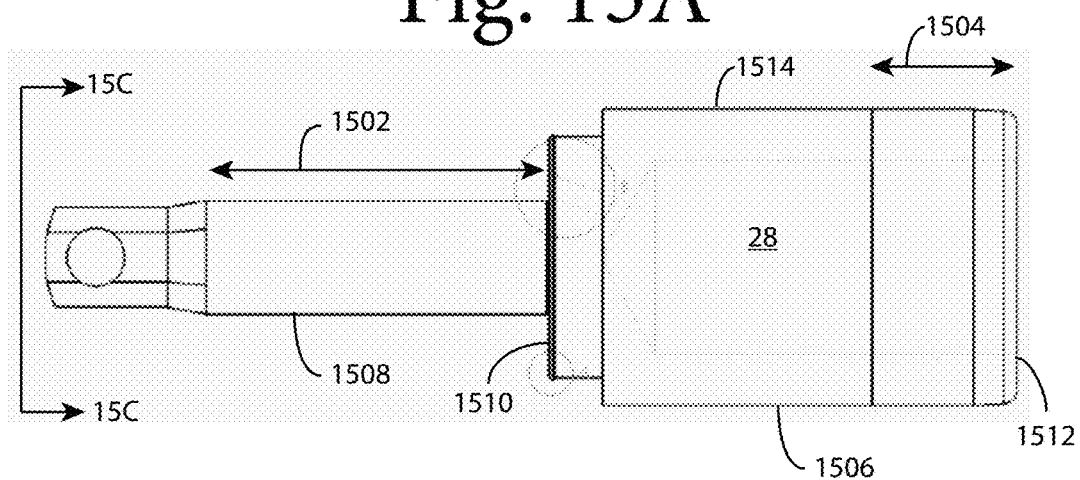
Figure 15C:
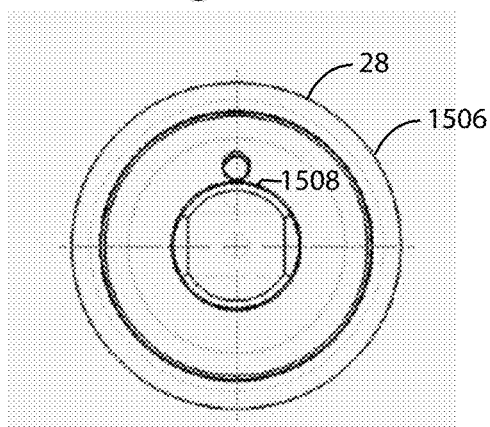

In one or more embodiments, a pressure relief valve 1000, shown in FIGS. 1-17, has a body 1, a piston 28, shown in detail in FIGS. 15A-15C, movably disposed within the body 1, and a bonnet assembly 8. In one or more embodiments, the pressure relief valve is typically connected to a line conduit (e.g. a pipe) in fluid communication with a fluid system containing a fluid under pressure, and a discharge conduit (e.g. a pipe) in fluid communication with a fluid containment or storage structure, sump, drain line, or other arrangement for receiving fluid relieved from the fluid system. An example of a fluid system is a mud pump system in an oil and gas drilling system.

In one or more embodiments, the valve body 1 has an inlet port 82 that is adapted to receive the line conduit, and an internally disposed annular chamber 84 (discussed below in connection with FIGS. 2, 4, 4A, 5, 6, and 7) in fluid communication with an outlet port 83 that is adapted to receive the discharge conduit. In one or more embodiments, the valve body 1 also has a valve body insert 79 (discussed below in connection with FIGS. 2, 4, 4A, 5, 6, and 7) providing an interior cylindrical wall surface that partially defines the enclosed chamber 84.

In one or more embodiments, shown in FIGS. 15A, 15B, and 15C, the piston 28 has a head 1506 and an elongated stem 1508 extending outwardly from the head 1506. In one or more embodiments, a stem bushing 10, shown in FIGS. 13A-13D, with a stem bushing insert 10a, shown in FIGS. 16A-16D, is mounted in the bonnet assembly 8 such that the bottom surface of the stem bushing 10 is spaced from the piston head 1506 when the piston 28 is at a first, or set, position as shown in FIG. 2, FIG. 4, FIG. 5, and FIG. 6. In one or more embodiments, at the first set position, the head 1506 of the piston 28 blocks the flow of fluid between the inlet port 82 and the outlet port 83. In one or more embodiments, the head 1506 has an annular upper surface 1510 that defines a lower wall of the enclosed chamber 84, and a lower surface 1512 facing the inlet port 82 of the valve body 1. A piston head body 1514 extends from the upper annular surface 1510 of the piston head to the lower surface 1512 of the piston head. In one or more embodiments, the upper piston seal 59 seals against the inner wall of the valve body insert 79. In one or more embodiments, the stem bushing seal 58 seals on a coated portion 1502 of the piston stem 1508. In one or more embodiments, the upper end of the piston stem 1508 is in contact with the stem bushing insert 10a. In one or more embodiments, the lower piston seal 4 seals on a coated lower surface 1504 of the piston 28.

Figure 4:
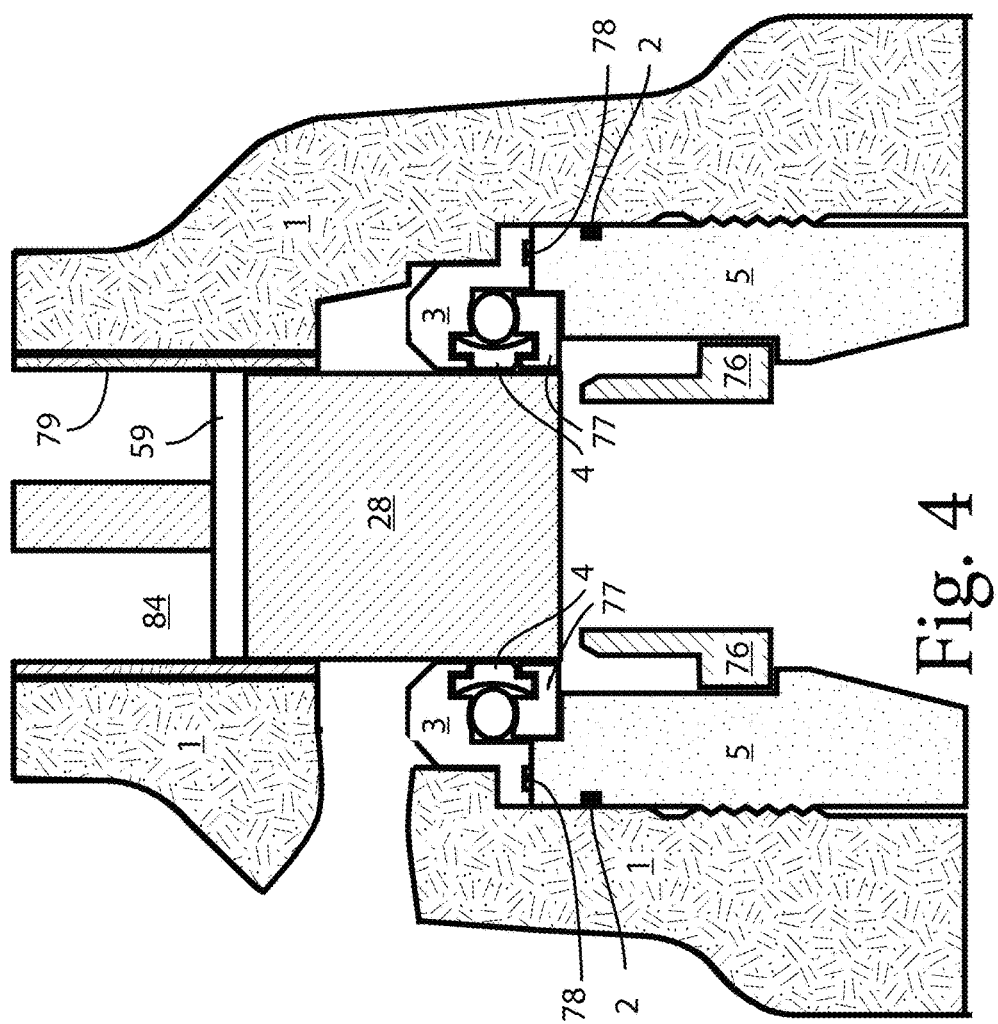
FIGS. 4 and 4A are cross-sectional views of the pressure relief valve piston sealing area of the pressure relief valve of FIG. 2.
Figure 4A:
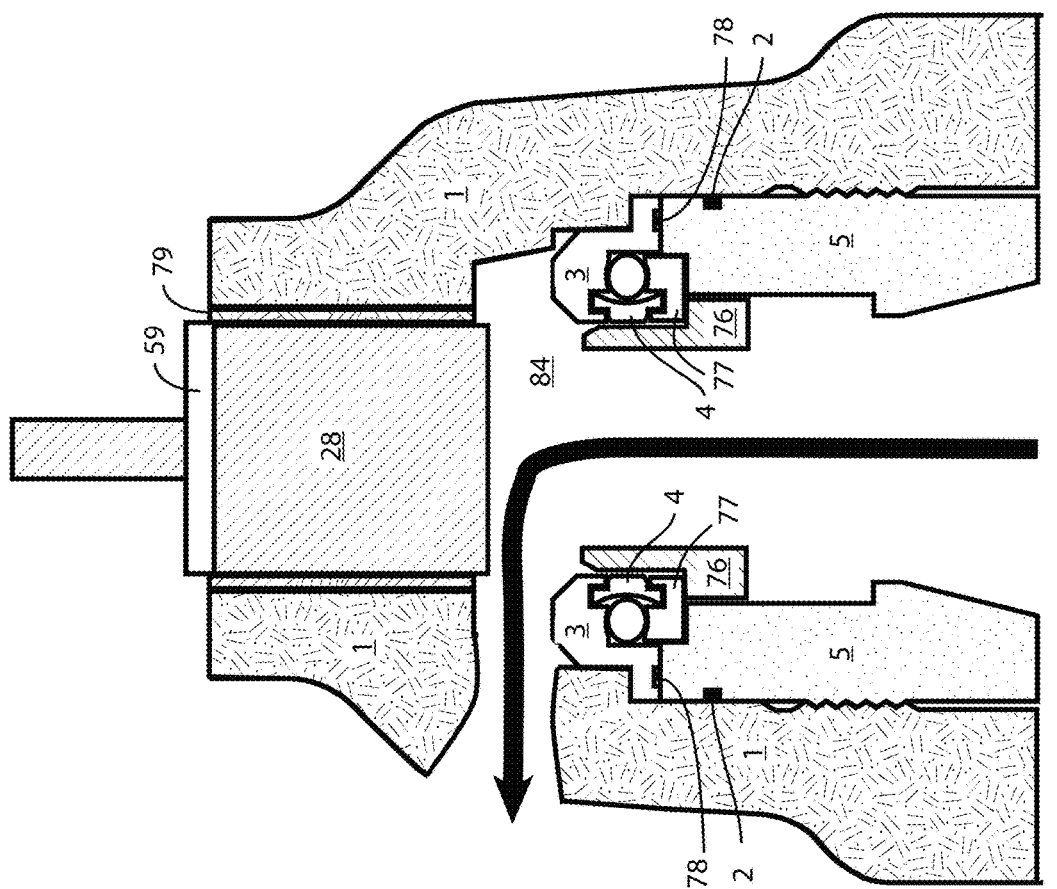

In one or more embodiments, in the first set position a seal guard 76, illustrated in detail in FIGS. 9A-9E, is contained within a sub 5, as shown in FIGS. 2, 4, 4A, 5, 6 and 7. In one or more embodiments, between the sub 5 and the body 1 are a seal retainer 3, a spacer ring 77, and a lower piston seal 4, as best seen in FIGS. 4 and 4A. In one or more embodiments, the seal retainer 3 and spacer ring 77 allow the lower seal 4 to energize and effectively seal against the coated lower surface 1504 of the piston 28 preventing fluid from leaking from the inlet port 82 to the outlet port 83. In one or more embodiments, the seal retainer 3 and spacer ring 77 are designed to allow for the lower piston seal 4 to seal against the piston 28 with grooves that limit the lower piston seal 4 from over energizing resulting in the lower piston seal 4 being distorted or leaking, as described below in connection with FIG. 17.

In one or more embodiments, in the first set position, a lower link 18, which is illustrated in detail in FIGS. 8A-8D, and which is connected to the stem 1508 of the piston 28 and upper link 19, is positioned with the pads 18a in contact with a crank 13. In one or more embodiments, both of the lower link pads 18a stay in contact with the crank 13 and remain parallel to a centerline of the piston 28. In one or more embodiments, the lower link 18 is constructed as a single unit, which enhances the ability of the lower link pads 18a to stay parallel to the centerline of the piston 28 not only in the first set position of the pressure relief valve but also as the pressure relief valve moves from the first set position to the second open position allowing the pressure relief valve to relieve system pressure.

In one or more embodiments, the valve body insert 79, the stem bushing insert 10a, and coatings on portions 1502 and 1504 of the piston 28 keep the level of friction consistent as the pressure relief valve 1000 moves from the first set position to the second open position and also keep the friction consistent after moving between first and second positions multiple times with an abrasive medium in the system fluid (e.g. drilling mud).

Figure 1:
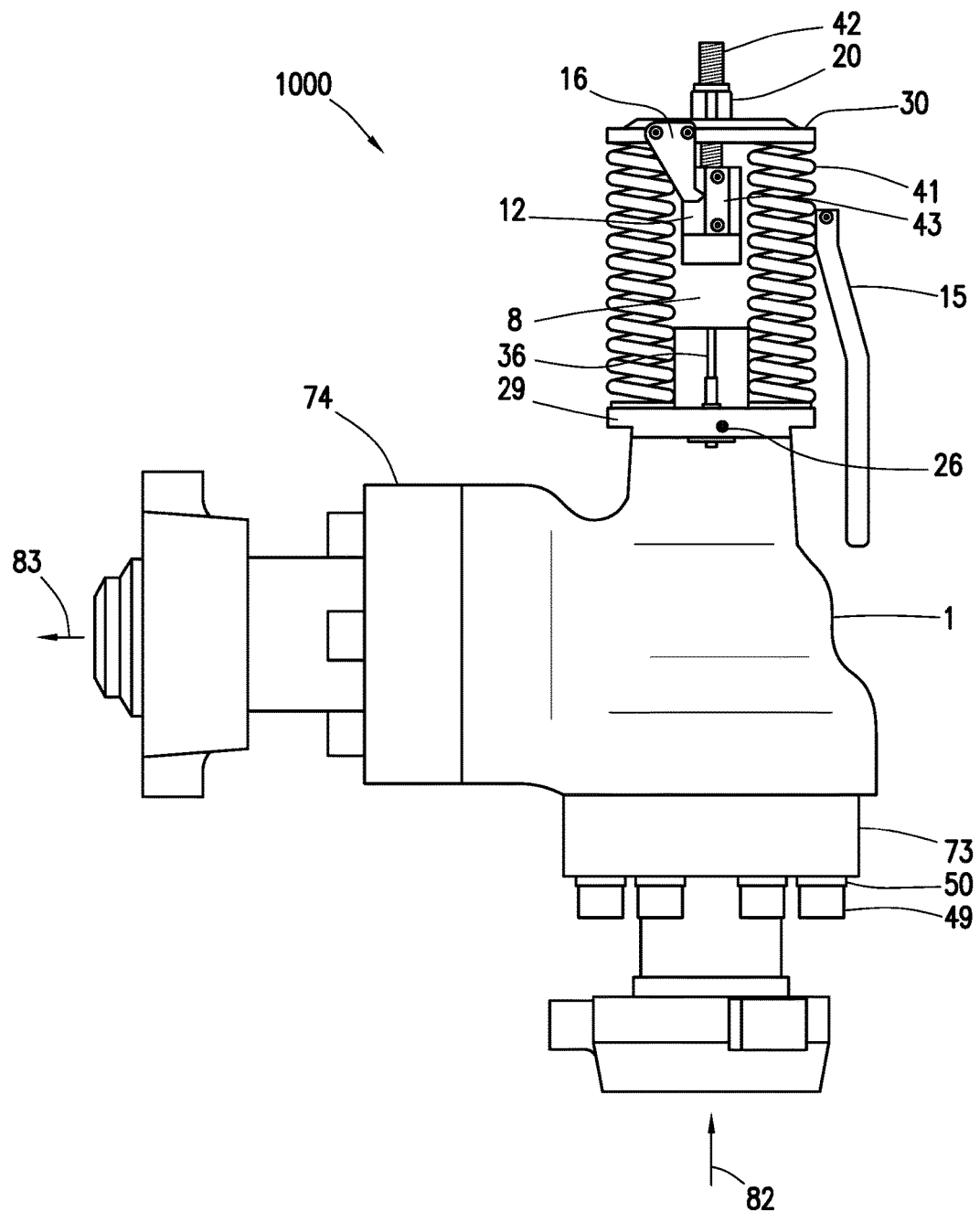
FIG. 1 is a perspective view of an embodiment of the pressure relief valve shown with connectors and hammer unions.
Figure 2:
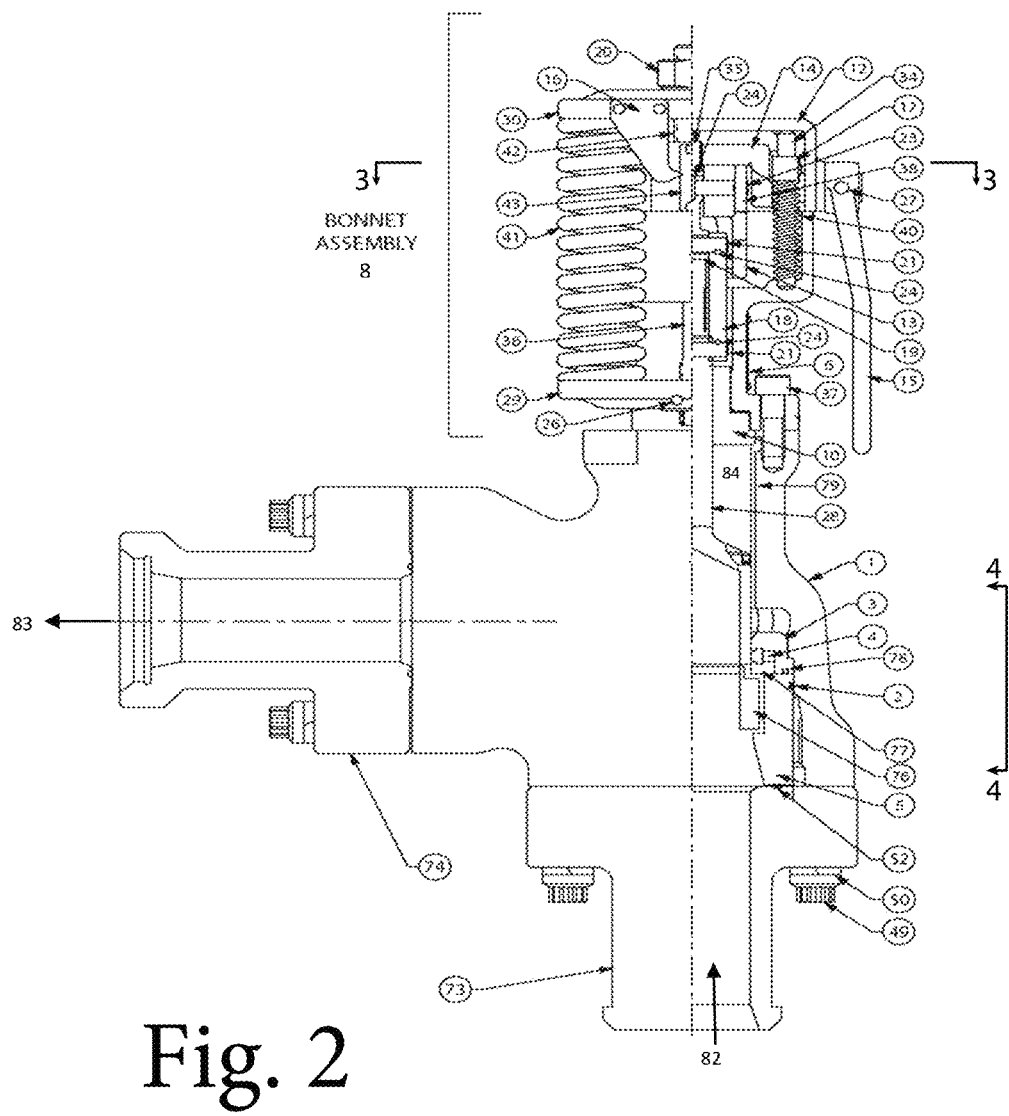
FIG. 2 is a cross-sectional view of an embodiment of the pressure relief valve with connectors.
Figure 3:
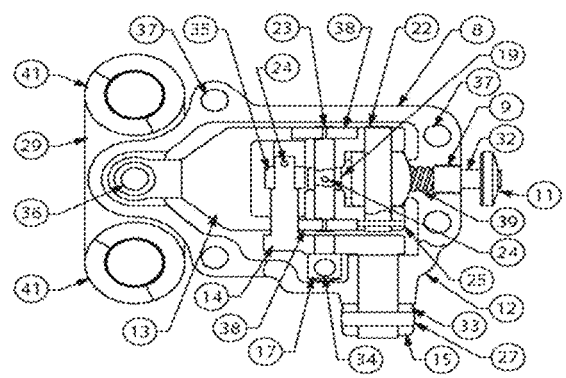
FIG. 3 is a transverse cross-sectional view of an embodiment of the pressure relief valve bonnet assembly of the embodiment of the pressure relief valve shown in FIG. 2.
Figure 5:
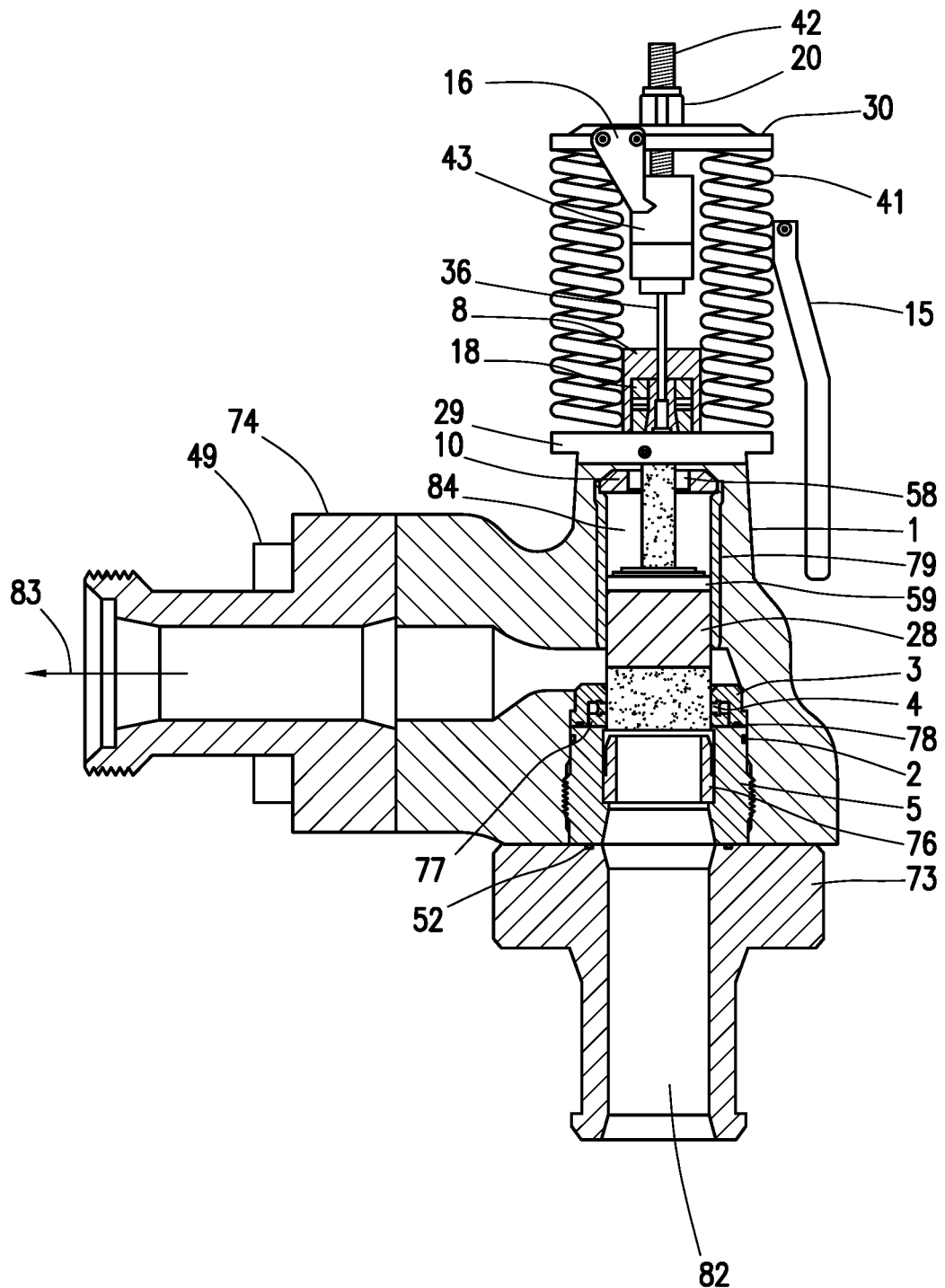
FIG. 5 is a cross-sectional view of the embodiment of the pressure relief valve shown in FIG. 2 with connectors. The valve is shown in the set, fluid-blocking position.
Figure 6:
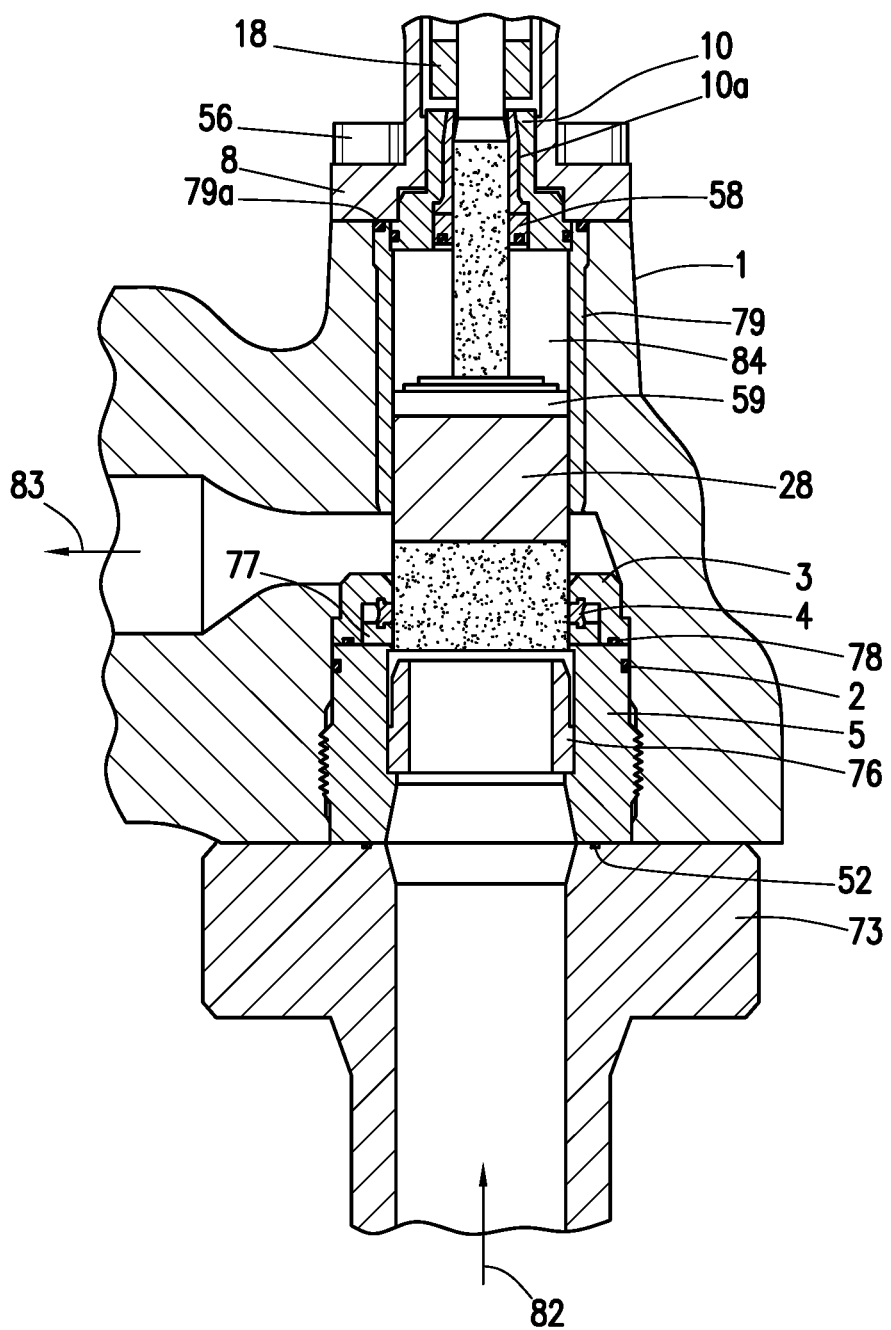
FIG. 6 is a cross-sectional view of an embodiment of the pressure relief valve body with inlet connector. The valve is shown in the set, fluid-blocking position.

In one or more embodiments, the pressure relief valve is calibrated to open at a set pressure. In one or more embodiments, the opening pressure level can be changed based on need by turning the adjusting nut 20 on the adjusting stud 42 to move the indicator 16 to the desired set pressure shown on the calibration plate 43, as shown in FIGS. 1, 2 and 5. In one or more embodiments, due to the trigger mechanism being an integral part of the fluid blocking element of the pressure relief valve, the consistent operation of the pressure relief valve is achieved, independent of the medium in the system fluid. In one or more embodiments, this is done by having a consistent and predictable level of resistance between the trigger mechanism and the system fluid. In one or more embodiments, the resistance is made up of the resistance provided by the load springs 41 and the friction between the moving components of the pressure relief valve.

Figure 7:
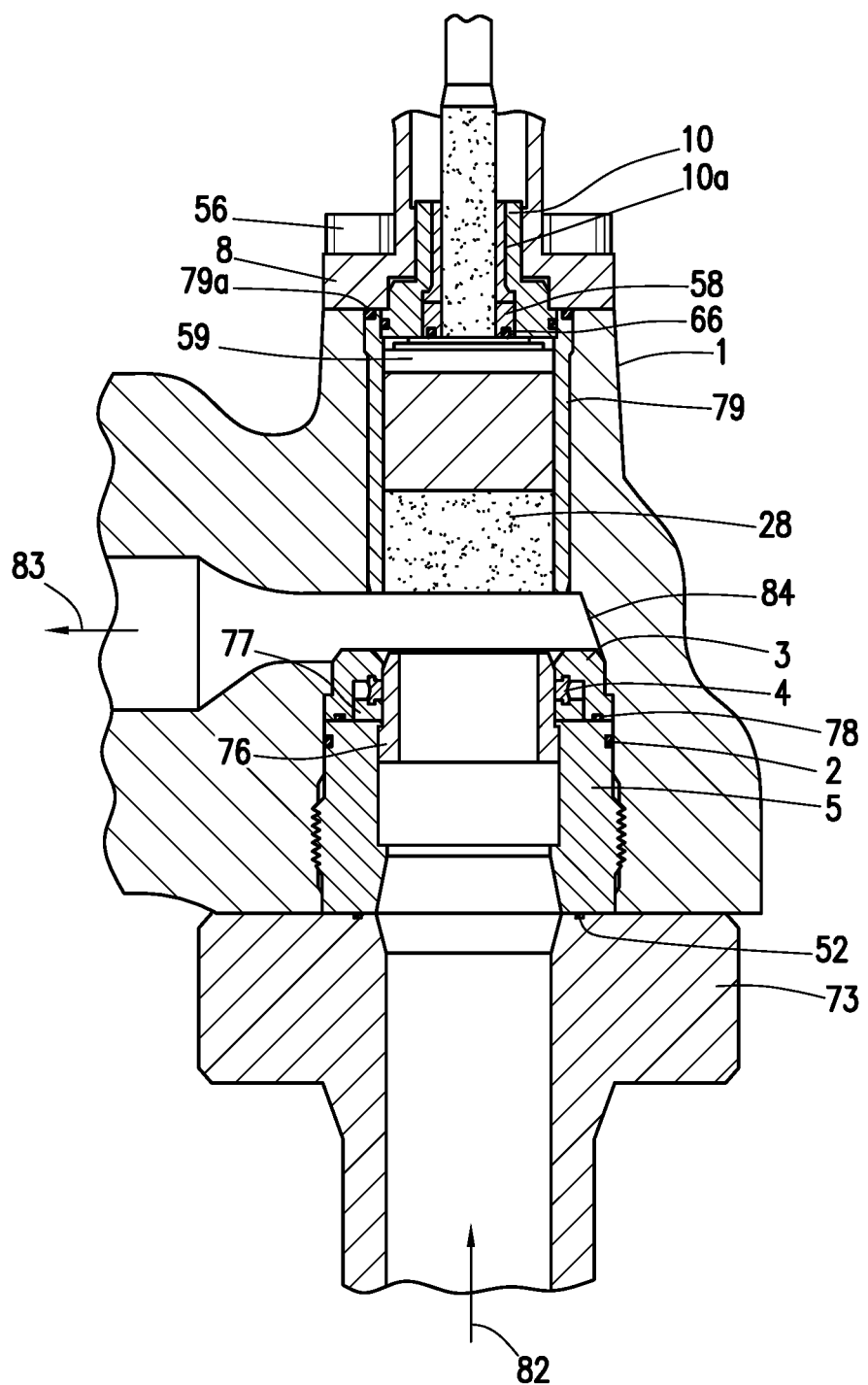
FIG. 7 is a cross-sectional view of an embodiment of the pressure relief valve body with inlet connector. The valve is shown in the fully open relief position. The seal guard is shown in place covering the lower piston seal.
Figure 9A:
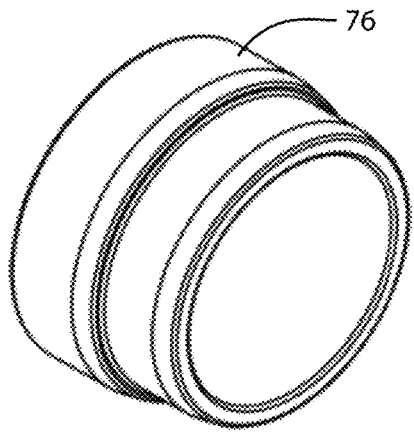
FIGS. 9A-9E are views of the seal guard.
Figure 9B:
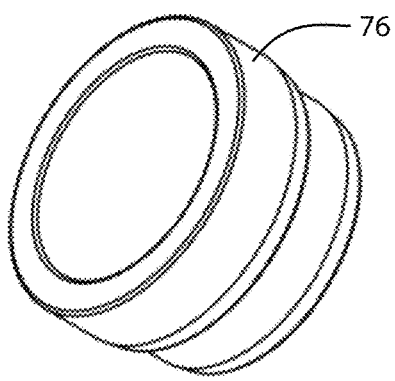
Figure 9C:
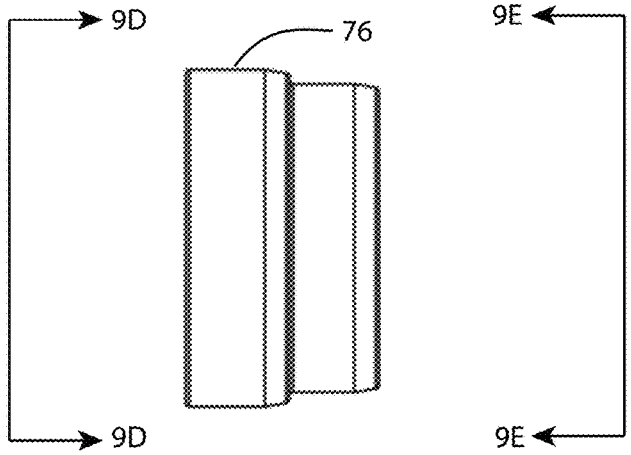
Figure 9D:
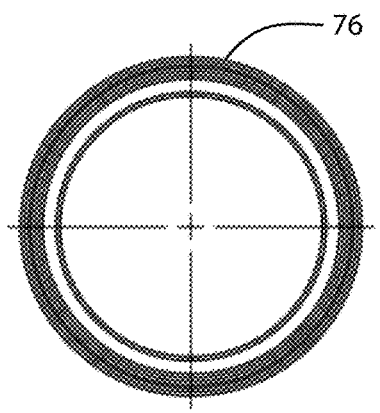
Figure 9E:
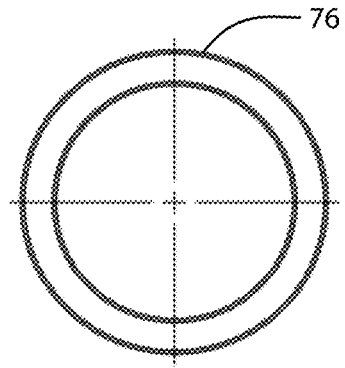
Figure 10A:
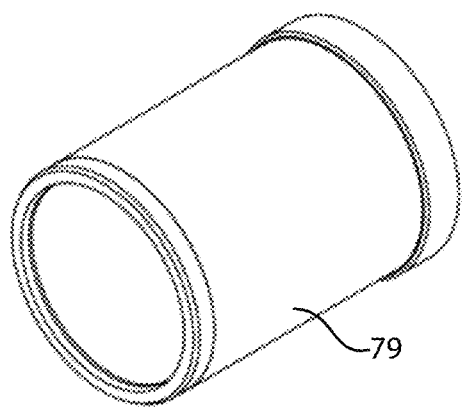
FIGS. 10A-10D are views of the valve body insert.
Figure 10B:
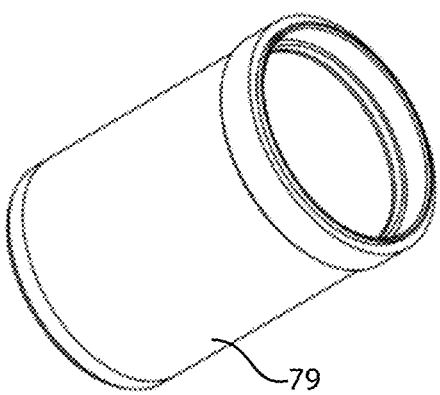
Figure 10C:
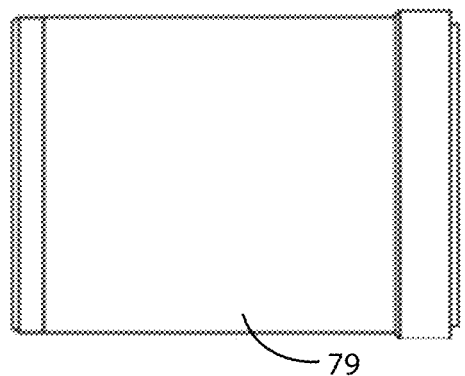
Figure 10D:
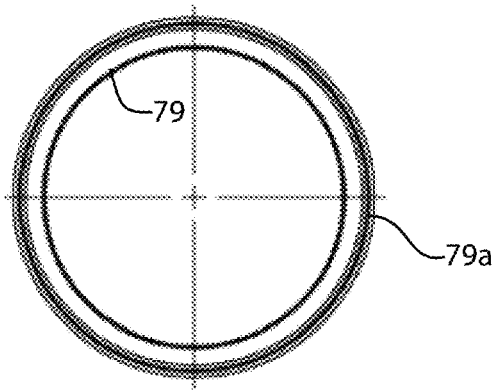
Figure 11A:
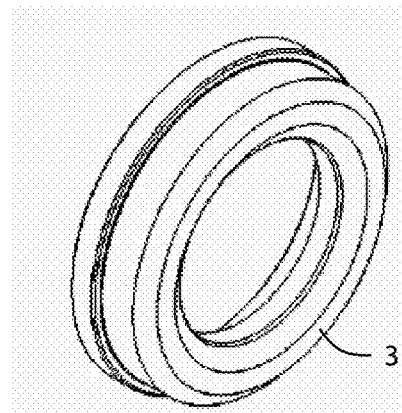
FIGS. 11A-11D are views of the seal retainer.
Figure 11B:
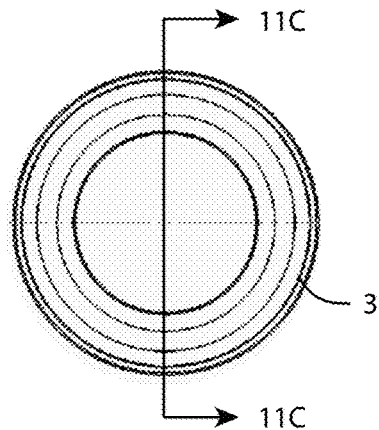
Figure 11C:
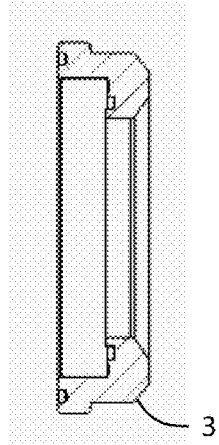
Figure 11D:
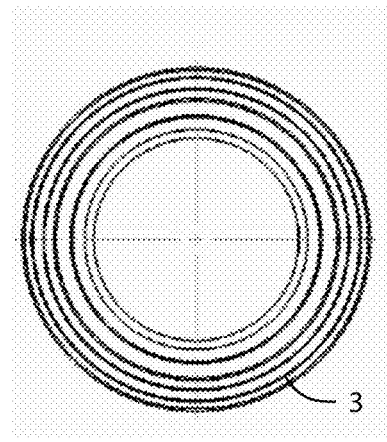
Figure 13A:
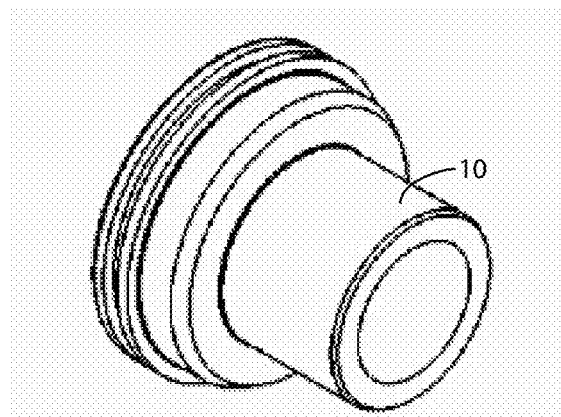
FIGS. 13A-13D are views of the stem bushing.
Figure 13B:
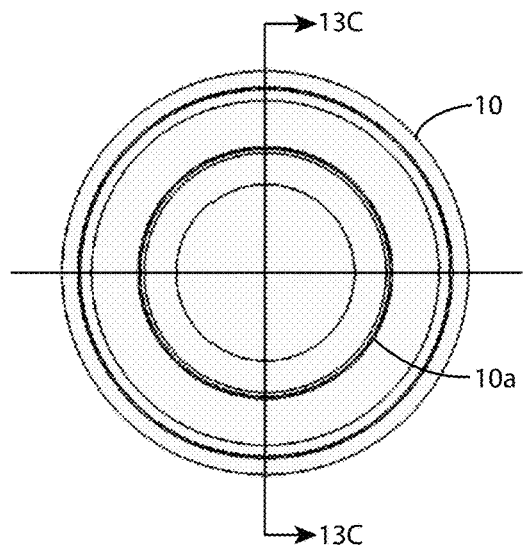
Figure 13C:
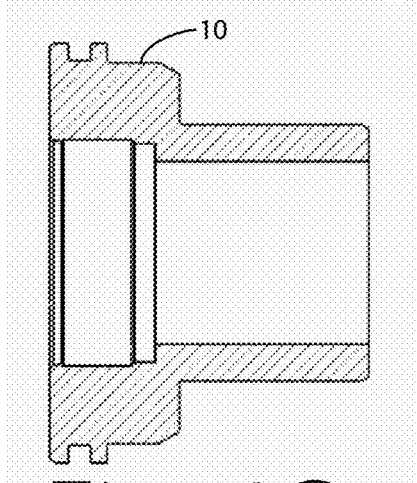
Figure 13D:
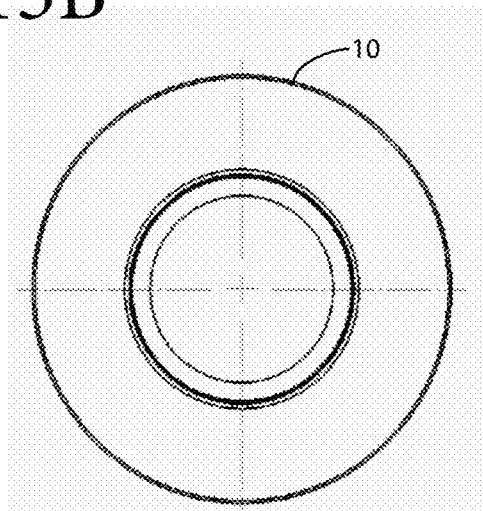
Figure 14:
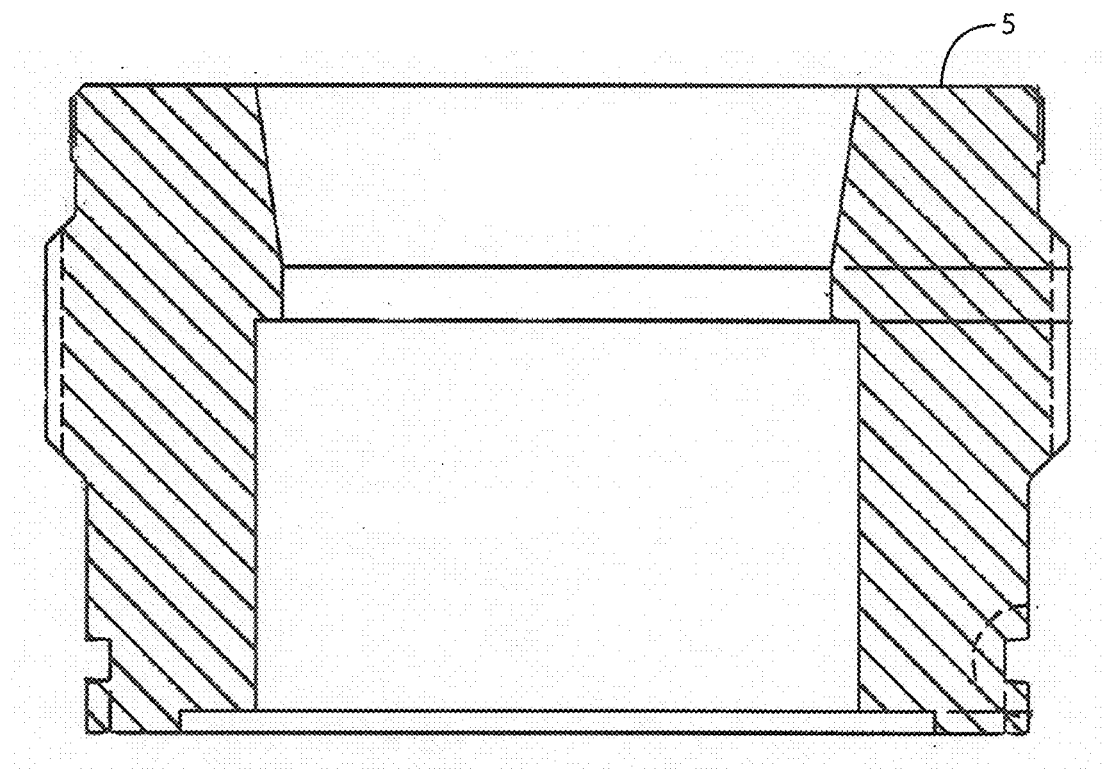
FIG. 14 is a cross-sectional view of the sub.

In one or more embodiments, the load springs 41 are predictable as they are compressed in order to set the resistance so that the pressure relief valve will stay in first set position until a set pressure is reached. In one or more embodiments, the second main component of resistance is provided by the lower piston seal 4, the stem bushing seal 58, and the upper piston seal 59. These three seals 4, 58, and 59 energize so without any system pressure the pressure relief valve is easily set to the first position. In one or more embodiments, as the system pressure increases the lower piston seal 4, the stem bushing seal 58, and the upper piston seal 59 continue to seal because the system pressure energizes the lower piston seal 4, the stem bushing seal 58, and the upper piston seal 59 allowing the lower piston seal 4, the stem bushing seal 58, and the upper piston seal 59 to seal at a greater and greater pressure level. In one or more embodiments, due to the higher pressure of the lower piston seal 4 on the lower portion of the piston 28, the stem bushing seal 58 on the stem of the piston 28, and upper piston seal 59 on the valve body insert 79, the surface finish of the components maintains a consistent amount of friction and allows the pressure relief valve to stay within calibration tolerances. In one or more embodiments, by having a hard coating, 50+ Rockwell, on the hard coated portions 1502 and 1504 of the piston 28 and a surface finish with a roughness of 20 µi $R_a$ or better allows the friction to stay consistent and predictable and resist scratching, scaring or deformity due to the abrasive medium e.g. drilling mud in the system fluid. In one or more embodiments, the hard coating on the lower portion of the piston 28 serves as a seal surface and resists wear as the pressure relief valve 1000 moves from the first set position, shown in FIGS. 2, 5, and 6, to a second open position, as seen in FIGS. 4A and 7. In one or more embodiments, as the piston 28 moves from the first set position, the lower portion of the piston 28 moves out of a sealing relationship with the lower piston seal 4. In one or more embodiments, as this occurs, the high pressure system fluid will discharge across the end of the piston 28 and the seal surface on the lower end of the piston 28. The hard coating protects the lower portion 1504 of the piston 28 from adverse abrasive wear as the high system pressure discharges across the seal surface before the piston 28 can move into the fully open position shown in FIG. 7.

In one or more embodiments, the upper valve body insert 79 is constructed of a hardened stainless steel material or some other abrasive and/or abrasive resistant material (such as titanium or some plastics) with a 20 µi $R_a$ finish or better for the upper piston seal 59 to seal against. This allows for the upper piston seal 59 to properly seal as well as allow the upper piston seal 59 to slide on the valve body insert 79 as the piston 28 moves from first position to the second position. The valve body insert 79 additionally has an o-ring 79a to seal against the bonnet sub-assembly 8 as well as to ensure that no fluid leaks from around the valve body insert 79.

Figure 17:
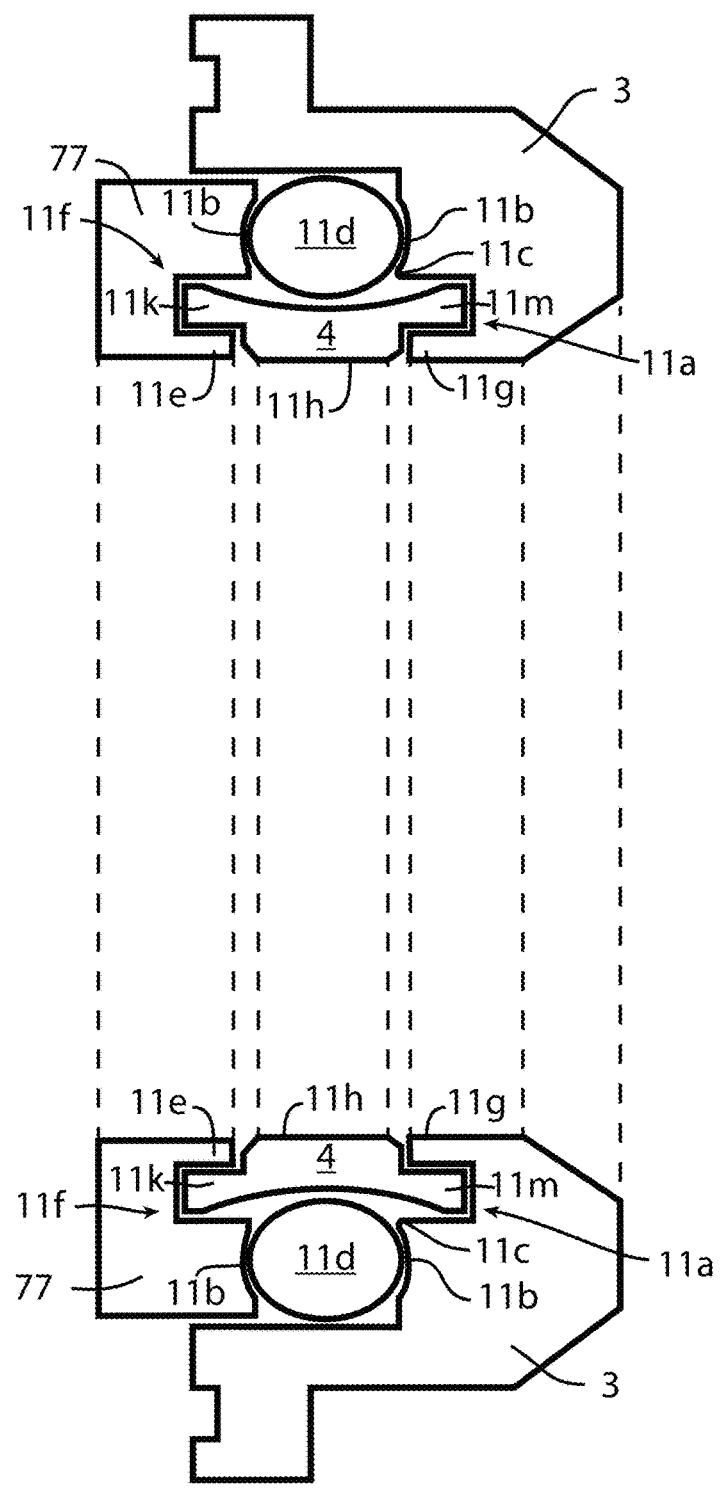
FIG. 17 is a view of the seal retainer, spacer ring, and lower piston seal.

In one or more embodiments, the seal retainer 3, spacer ring 77, and lower piston seal 4 work together to seal the system fluid on the lower end of the piston 28, as best shown in FIG. 17. In one or more embodiments, the seal retainer 3 and spacer ring 77 have a radius 11b to hold an o-ring 11d in position when the lower piston seal 4 is not under pressure, which allows the o-ring 11d to pressurize the lower piston seal 4. In one or more embodiments, the seal retainer 3 and spacer ring 77 have matching grooves 11a (the seal-retainer groove, one side of which is formed by a spacer-ring-lower-piston-seal capturing arm) and 11f (the spacer-ring groove, one side of which is formed by a seal-retainer-lower-piston-seal capturing arm 11e) that the ends 11k (the first lower-piston-seal arm) and 11m (the second lower-piston-seal arm) of the lower piston seal 4 fit into and are secured by. In one or more embodiments, as the pressure increases on the lower piston seal 4, the o-ring 11d is compressed towards the seal retainer 3 allowing pressure from the compression of the o-ring 11d on the lower piston seal 4 and pressure directly on the lower piston seal 4 to cause the lower-piston-seal pad 11h to seal against the piston 28. In one or more embodiments, the grooves 11a and 11f on both the seal retainer 3 and spacer ring 77 stop the lower piston seal 4 from contracting too much under pressure and assist the lower piston seal 4 in returning to its normal position after the pressure has been relieved in the pressure relief valve. In one or more embodiments, the seal retainer 3 has an o-ring return radius 11c that allows the o-ring 11d to return to its original position after the pressure has been relieved on the lower piston seal 4.

In one or more embodiments, the function of the seal guard 76 is seen as the pressure relief valve moves from the first to second position. In one or more embodiments, illustrated in FIGS. 4 and 4A, as the piston 28 moves upward, the seal guard 76 is pushed in the direction of the piston 28 by the system fluid and/or, in one or more embodiments, by a spring or springs (not shown). In one or more embodiments, the seal guard 76, shown in detail in FIGS. 9A-9E, is a cylindrical device designed so a portion will fit within the inside of the lower piston seal 4, while a portion of the seal guard 76 is larger than the spacer ring 77 (as best shown in FIG. 4) to stop the seal guard 76 once it has reached the position of protecting the lower piston seal 4 (as best shown in FIGS. 4A and 7), with an opening on the inside diameter to allow the system fluid to discharge through the seal guard 76 without causing any friction damage to the lower piston seal 4 due to the abrasive system fluid. In one or more embodiments, the seal guard 76 is made of a lightweight material such as titanium so that if the system pressure is relieved at a high flow rate, the inertia of the seal guard 76 moving to protect the lower piston seal 4 will not damage the spacer ring 77 or seal retainer 3. In one or more embodiments, the seal guard 76 will continue to protect the lower seal 4 from the discharge fluid until the system pressure has been relieved and the action of moving the piston 28 back to the first set position will push the seal guard 76 towards the inlet 82 allowing the piston 28 to seal on the inside diameter of the lower seal 4. In one or more embodiments, when the seal guard 76 is in the position in which it protects the lower piston seal 4, as shown in FIGS. 4A and 7, the lower piston seal 4 is not exposed to the flow of the fluid through the pressure relief valve. This extends the life of the lower piston seal 4, and keeps lower piston seal 4 operating within design tolerances, i.e., the amount of friction the lower piston seal 4 presents to the piston 28, which is a factor in determining when the pressure relief valve moves from the first set position, shown in FIGS. 2, 4, 5, and 6, to the second open position, shown in FIGS. 4A and 7.

In one or more embodiments, the pressure relief valve moving from the first set position, shown in FIGS. 2, 4, 5, and 6 to the second open position, shown in FIGS. 4A and 7, allows the piston 28 to move from a fluid blocking function to the system fluid being unencumbered as it is released through the outlet port 83. In one or more embodiments, as the set pressure of the pressure relief valve is reached, the piston 28 will begin to slightly move before rapidly opening to relieve the system pressure. In one or more embodiments, during the transition from first to second position, the upper piston stem 28 will slide against the stem bushing insert 10a (see FIG. 6). In order to hold the high pressure required of the stem bushing 10 the stem bushing 10 is made of a steel that allows for the pressure to be properly held while the stem bushing insert 10a material is made of a low friction material to keep the resistance on the piston stem 1508 (and therefore the piston 28) caused by friction consistent. In one or more embodiments, the resistance caused by the friction between the piston 28 and the stem bushing insert 10a directly effects the calibration of the pressure relief valve. In one or more embodiments, the stem bushing insert 10a inside diameter may be slightly tapered to match the angle of the piston 28 when the pressure relief valve is in the first set position. In one or more embodiments, this allows the friction to be more consistent during the movement of the piston 28 from the first set position to the second open position.

References in the specification to "one or more embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
a body;
an inlet port providing a fluid entrance to the body;
a chamber having an inner surface;
an outlet port in fluid communication with the chamber and providing a fluid exit from the body;
a piston disposed within the chamber, wherein the piston is moveable between:
a first set position, in which the inlet port is not in fluid communication with the outlet port, and
a second open position, in which the inlet port is in fluid communication with the outlet port through the chamber;
a seal secured to the inner surface of the chamber and biased against the piston when the piston is in the first set position;
a seal guard slidably disposed within the chamber;
a seal retainer secured to the inner surface of the chamber, the seal retainer comprising:
a seal-retainer body;
a first o-ring accepting radius, and
a seal-retainer groove formed in the seal-retainer body by a seal-retainer-lower-piston-seal capturing arm;
a spacer ring comprising:
a spacer-ring body;
a second o-ring accepting radius, wherein the spacer ring is positioned relative to the seal retainer to form an o-ring orifice with an open side, a closed side opposite the open side, the first o-ring accepting radius, and the second o-ring accepting radius, and
a spacer-ring groove formed in the spacer-ring body by a spacer-ring-lower-piston-seal capturing arm,
wherein the seal-retainer-lower-piston-seal capturing arm and the spacer-ring-lower-piston-seal capturing arm impinge on opposite sides of the open side of the o-ring orifice;
an o-ring contained in the o-ring orifice; and
a lower piston seal comprising:
a lower-piston-seal pad biased against the piston by the o-ring;
a first lower-piston-seal arm coupled to a first side of the lower-piston-seal pad and positioned in the spacer-ring groove;
a second lower-piston-seal arm coupled to a second side of the lower-piston-seal pad and positioned in the seal-retainer groove;
wherein the seal guard is moveable between a first seal-guard position in which the seal guard does not shield the seal and a second seal-guard position in which the seal guard shields the seal,
wherein the seal guard is in the first seal-guard position when the piston is in its first set position and the seal guard is in the second seal-guard position when the piston is in its second open position.

2. An apparatus comprising:
a seal retainer comprising:
a seal-retainer body;
a first o-ring accepting radius formed in the seal-retainer body, the first o-ring accepting radius having a shape of a poloidal arc of a torus, and
a seal-retainer groove formed in the seal-retainer body by a seal-retainer-lower-piston-seal capturing arm;
a spacer ring comprising:
a spacer-ring body;
a second o-ring accepting radius formed in the spacer-ring body, the second o-ring accepting radius having a shape of a poloidal arc of a torus, wherein the spacer ring is positioned relative to the seal retainer to form an o-ring orifice with an open side, a closed side opposite the open side, the first o-ring accepting radius, and the second o-ring accepting radius, and
a spacer-ring groove formed in the spacer-ring body by a spacer-ring-lower-piston-seal capturing arm,
wherein the seal-retainer-lower-piston-seal capturing arm and the spacer-ring-lower-piston-seal capturing arm impinge on opposite sides of the open side of the o-ring orifice;
an o-ring contained in the o-ring orifice; and
a lower piston seal comprising:
a lower-piston-seal pad adjacent to the o-ring;
a first lower-piston-seal arm coupled to a first side of the lower-piston-seal pad and positioned in the spacer-ring groove;
a second lower-piston-seal arm coupled to a second side of the lower-piston-seal pad and positioned in the seal-retainer groove.

3. The apparatus of claim 2 further comprising:
an o-ring return radius on a corner of the seal-retainer groove opposite the spacer-ring-lower-piston-seal capturing arm.

* * * * *